Patented Nov. 25, 1941

2,263,576

UNITED STATES PATENT OFFICE 2,263,576

PROCESS OF COATING PAPER AND PRODUCT THEREOF

William M. Glenn, Aurora, Ill., assignor to Glenn Davidson

No Drawing. Application June 14, 1939, Serial No. 279,170

15 Claims. (Cl. 91—68)

In the preparation of coated papers such as are employed for printing usages, etc. it has been customary to prepare the paper by a simple coating of casein and clay. Casein while having certain advantages, is under the disadvantage of tending to be very irregular in quality as a raw material and correspondingly presenting considerable difficulties to the coated paper manufacturer. Efforts to employ another material such as vegetable proteinous material, as illustrated in soya bean, have encountered the difficulty that the coated product made with such material is weaker than the casein coated product, and this has constituted a serious obstacle, notwithstanding other attractive features, such as uniformity of material, low cost, etc. I have now found however that vegetable proteinous material may be applied in such manner and relation as to provide a product having outstanding strength, as well as desirable finish and printing properties.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that the difficulty with vegetable protein coating is not due to weakness in the body of such coating itself but is due to its failure to satisfactorily bond with the paper surface, and although the animal protein casein has a molecular structure whose surface action has particular affinity for the molecular surface of cellulose, vegetable protein is different and its surface affinity for cellulose is deficient. Whether this difference between the animal protein and the vegetable protein is due to fundamental difference in exposed amino groups, that is the polarity of the molecules in surface action with respect to the surface molecules of the cellulose, is not known, but irrespective of any theoretical considerations, the fact remains that the vegetable type protein lacks the characteristic necessary for effective bonding on paper surface. And, I have found that if the cellulose surface be masked or covered with a layer or film which is not of vegetable proteinous character, vegetable proteinous material can then be bonded onto that surface with remarkably tenacious bonding which makes it possible to attain advantages in the product superior in many respects to coated products previously known. The avoiding of direct contact of the cellulose molecules with vegetable protein molecules, with the inherent lack of compatibility, and the masking of the cellulose surface results in the bonding of the vegetable protein molecules with particular efficiency. The paper to be coated, may be any usual or preferred grade, and in this I first apply a surfacing of material which is not of vegetable proteinous character. Various materials may be employed for this, such as starches, gums, synthetic resins, rubber latex, certain soaps, dextrine, water glass, animal protein such as casein. The common feature of all of these is the absence of the characteristic vegetable protein molecule. Desirably for example I apply tapioca, the flour thereof being made into a solution with water. Thus, a four per cent solution of tapioca may be applied to the paper by any suitable coating applicator means, such as to deposit approximately one pound of tapioca, on dry weight basis, per side of the sheet per ream of 500 sheets each measuring twenty-five by thirty-eight inches and weighing for example forty-five pounds. That is, an amount of two pounds, dry basis, to a ream unit of about sixty-five hundred square feet of paper surface. The finish coat of clay and vegetable proteinous material is finally applied to the surface thus prepared, the cellulose molecules being excluded from direct contact with the vegetable protein molecules by the thus interposed film of non-vegetable proteinous character whereby the surface of the cellulose is sealed and the affinity or adhesion effective for the vegetable proteinous and clay material is promoted. If the finish coating is put on by spray or roll type coating devices, the cellulose-masking coating of tapioca or the like need not be dried, and this is quite a manufacturing advantage, but if the finish coating be applied by means of a brush type coating machine it is advisable to dry the coating of tapioca or the like lest the brushing disturb it too much. The paper product with the tapioca sizing or masking and the finish coating of vegetable proteinous material, as for instance soya bean, with clay or like mineral filler is particularly strong, and a wood pulp stock paper for instance running forty-three pounds, sized with tapioca at the rate of two pounds, one pound per side per ream, can have then tensile strength of an all wood pulp paper of forty-five pounds weight per ream, the same kind of wood pulp stock being used in both cases. Similarly to the tapioca mentioned, other starch, such as corn starch, may be applied, as by being made up to a five per cent solution for instance treated with ten per cent caustic soda on the basis of the starch, and applied in similar spread as the tapioca, also rubber latex in five per cent solution applied in similar amount, also synthetic resins such as urea-formaldehyde resin or acrylic acid resin using desirably ten to fifteen per cent solutions and applying one to four pounds, dry resin basis, per side per ream of paper, also mahogany soap emulsions using five per cent suspensions and applied at about the same rate as tapioca, also gums such as locust gum, gum tragacanth and the like, in analogous strength and rate of application as with the tapioca. I may also apply, somewhat less desirably, dextrine in 20–40 per cent solutions, applying five to ten pounds per side per ream, or water glass at the same rate, or gum arabic at the same rate, or barium fatty acid soaps using a five per cent suspension and applying one to two pounds per side per ream, or casein using a five per cent solution and applying one to two pounds per side per ream. With all of these materials, the cellulose molecules are masked or covered, the free surface being affected physically rather than chemically, so that the coating which goes directly on the cellulose is of a character substantially free from vegetable protein. And with that accomplished, the finish coating of vegetable protein and mineral filler is isolated from direct contact with the cellulose and the strength of bond is remarkably higher than could be obtained by applying a vegetable protein against the cellulose. In general, material such as tapioca can be applied at one-fourth to three or more pounds per side per ream.

Peculiarly, whereas a tapioca coating or the like as above-described in under-lay combination with the finish coating of vegetable proteinous material and clay or like mineral filler shows such surprising results, if instead of the vegetable proteinous material and clay there be applied a casein and clay coating it has little result. The exclusion of direct contact between the vegetable protein and the cellulose is specific.

Soya bean, the flour particularly, or the isolated protein, is desirable as the vegetable proteinous material for the finish coating, and other like oil seed materials conveniently had for instance from the residues of oil pressing or extraction, such as peanut, etc. may be employed, also protein or glutin from corn, wheat, etc. And the amount of clay or other mineral surfacing filler may vary somewhat depending upon the precise character of the product desired, and may be for illustration one hundred pounds of clay per twelve pounds of soya bean flour or equivalent, the mixture being made up into a suspension by procedure as desired, for instance by stirring one hundred pounds of soya bean flour to smooth suspension in four hundred pounds of water containing two pounds of pine oil, then heating the mixture to 140–150° F., and adding five and one-half pounds of caustic soda dissolved in twenty-five pounds of water. This temperature is maintained for about fifteen to twenty minutes, then sixty-five pounds of cold water is added and the mixture is allowed to cool if not to be used at once, or it may be added directly while still warm, to a clay slip prepared by dissolving two and one-half ounces of caustic soda in forty pounds of water containing one pound of pine oil, and to this solution one hundred pounds of dry paper-coating clay is added and the mixture is stirred until free from lumps. To this clay slip there is then added sixty pounds of the soya mixture (corresponding approximately to twelve pounds dry soya flour) prepared as foregoing. The mixture of vegetable proteinous material and clay after being thoroughly stirred is applied to the paper which has been surfaced with the coating as described above substantially free from vegetable protein, and the final coated product is dried.

I have found also that where it may be desired for any reason to substitute part of the vegetable proteinous material with casein, thereby employing a vegetable proteinous and casein finish coat, this may be done, and with the advantages of the vegetable proteinous material and results superior to casein alone. The coating next to the cellulose surface is applied as aforedescribed, using any of the materials as indicated for isolating the vegetable proteinous material from direct contact with the cellulose, and the final finish coat is applied, as described, such finish coating including such proportion of casein with vegetable proteinous material as is desired; thus fifty per cent of casein in the vegetable proteinous material, or twenty-five per cent of the casein, although the proportion may be varied quite widely from these illustrative amounts. And, in making up the clay or mineral filler suspension with the proteinous material, similarly as described, the vegetable proteinous material and the casein are stirred into smooth suspension in water, for instance at the rate of one hundred pounds of the dry vegetable proteinous material and casein in five hundred pounds of water with the aid of five and one-half pounds of caustic soda, and then this mixture is made up with the clay slip or the like such that the final composition thereof contains for instance twelve pounds of vegetable proteinous material and casein per one hundred pounds of clay and one hundred forty pounds of water.

The coated product in accordance with the invention thus involves a cellulosic base upon the surface of which is a coating substantially free from vegetable protein, and upon the latter is the finish coating containing vegetable proteinous material and finish mineral filler.

This application is a continuation, in part, and as to common subject matter, of my application Ser. No. 197,879, filed March 24, 1938.

Other modes of applying the principle of the invention may be employed, change being made as regards the details described, provided the features stated in any of the following claims, or the equivalent of such, be employed.

I therefore particularly point out and distinctly claim as my invention:

1. A process of making coated paper, which comprises applying to the paper a solution of tapioca to deposit tapioca at the rate of two pounds, dry basis, to about sixty-five hundred square feet of paper surface, and subsequently applying thereon an aqueous oilseed flour and clay suspension at the rate of about twelve pounds of oilseed flour and one hundred pounds of clay.

2. A process of making coated paper, which comprises sealing the surface of the paper with a light tapioca sizing, and applying thereon an oilseed proteinous mineral filler coating.

3. A process of making coated paper, which comprises bonding a vegetable proteinous suspension of mineral filler to paper by first applying a starch sizing directly on the paper, and subsequently applying the vegetable proteinous suspension of mineral filler on such sizing layer.

4. A process of making coated paper, which comprises bonding a vegetable proteinous suspension of mineral filler to paper by applying to the paper a sizing containing no vegetable proteinous material or cellulose, and subsequently applying the vegetable proteinous mineral filler on the sizing layer.

5. A process of making coated paper, which comprises bonding oilseed proteinous mineral filler coating to paper by applying to the paper a starch sizing, and before such sizing is dry applying to its surface an oilseed proteinous mineral filler coat.

6. A process of making coated paper, which comprises bonding a vegetable proteinous mineral filler coating to paper by applying to the paper a coat of sizing containing no vegetable proteinous material or cellulose, and before such sizing is dry applying to its surface a vegetable proteinous mineral filler coat.

7. A process of making coated paper, which comprises applying to the paper a starch sizing, and subsequently applying to that surface a finish coating of casein and vegetable proteinous material.

8. A process of making coated paper, which comprises applying to the paper a sizing containing no vegetable proteinous material or cellulose, and subsequently applying to that surface a finish coating of casein and vegetable proteinous material.

9. A process of bonding a vegetable proteinous finish coat to a cellulosic base, comprising preventing contact of the vegetable protein directly with cellulose by interposing a coating containing no vegetable proteinous material or cellulose.

10. Coated paper having tapioca sizing on the cellulose and a superposed finish-surfacing of oilseed flour and clay.

11. Coated paper having tapioca sizing on the cellulose and a final finish coating of mineral filler in oilseed proteinous medium.

12. Paper having plural coating layers, the first a starch sizing directly on the paper, and second an oilseed proteinous suspension of mineral filler on the sizing layer.

13. Paper having plural coating layers, the first a starch sizing on the paper, and second a finish coating of casein and vegetable proteinous material.

14. Paper having a finish coating of casein and vegetable proteinous material, and an interposed coating containing no vegetable proteinous material or cellulose.

15. A plural layer coated product in which the base is cellulosic and the finish surface is a coat of vegetable proteinous material out of direct contact with cellulose by an interposed coating containing no vegetable proteinous material or cellulose.

WILLIAM M. GLENN.